United States Patent
Jordan et al.

(10) Patent No.: US 7,430,643 B2
(45) Date of Patent: Sep. 30, 2008

(54) MULTIPLE CONTEXTS FOR EFFICIENT USE OF TRANSLATION LOOKASIDE BUFFER

(75) Inventors: Paul J. Jordan, Austin, TX (US); William J. Kucharski, Louisville, CO (US); Roman M. Zajcew, La Mesa, CA (US); Ashley N. Saulsbury, Los Gatos, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 310 days.

(21) Appl. No.: 11/026,187

(22) Filed: Dec. 30, 2004

(65) Prior Publication Data

US 2006/0161760 A1 Jul. 20, 2006

(51) Int. Cl.
*G06F 9/28* (2006.01)
(52) U.S. Cl. .................... 711/150; 711/206; 712/215
(58) Field of Classification Search ............... 711/147, 711/154, 206
See application file for complete search history.

(56) References Cited

U.S. PATENT DOCUMENTS

| | | | | |
|---|---|---|---|---|
| 5,712,791 | A | 1/1998 | Lauterbach | 364/489 |
| 5,862,450 | A | 1/1999 | Mandal et al. | 455/3.1 |
| 5,933,627 | A | 8/1999 | Parady | 395/569 |
| 6,016,542 | A | 1/2000 | Gottlieb et al. | 712/225 |
| 6,092,154 | A | 7/2000 | Curtis et al. | 711/137 |
| 6,098,169 | A | 8/2000 | Ranganathan | 712/227 |
| 6,108,660 | A | 8/2000 | Ikeda et al. | 707/101 |
| 6,141,692 | A | 10/2000 | Loewenstein et al. | 709/234 |
| 6,247,121 | B1 | 6/2001 | Akkary et al. | 712/239 |
| 6,272,520 | B1 | 8/2001 | Sharangpani et al. | 709/108 |

(Continued)

FOREIGN PATENT DOCUMENTS

| | | |
|---|---|---|
| EP | 1221086 A1 | 3/2001 |
| EP | 1555618 A2 | 7/2005 |

OTHER PUBLICATIONS

Search Report for Application No. GB0525506.2 dated Mar. 28, 2006.

(Continued)

*Primary Examiner*—B. James Peikari
(74) *Attorney, Agent, or Firm*—Osha - Liang LLP

(57) ABSTRACT

The present invention provides a method and apparatus for increased efficiency for translation lookaside buffers by collapsing redundant translation table entries into a single translation table entry (TTE). In the present invention, each thread of a multithreaded processor is provided with multiple context registers. Each of these context registers is compared independently to the context of the TTE. If any of the contexts match (and the other match conditions are satisfied), then the translation is allowed to proceed. Two applications attempting to share one page but that still keep separate pages can then employ three total contexts. One context is for one application's private use; one of the contexts is for the other application's private use; and a third context is for the shared page. In one embodiment of the invention, two contexts are implemented per thread. However, the teachings of the present invention can be extended to a higher number of contexts per thread.

21 Claims, 5 Drawing Sheets

U.S. PATENT DOCUMENTS

| | | |
|---|---|---|
| 6,295,600 B1 | 9/2001 | Parady ................. 712/228 |
| 6,308,279 B1 | 10/2001 | Toll et al. ................. 713/323 |
| 6,314,563 B1 | 11/2001 | Agesen et al. ................. 717/9 |
| 6,535,905 B1 | 3/2003 | Kalafatis et al. ........... 709/108 |
| 6,578,137 B2 | 6/2003 | Parady ................. 712/228 |
| 6,609,193 B1 | 8/2003 | Douglas et al. ............. 712/219 |
| 6,625,654 B1 | 9/2003 | Wolrich et al. ............. 709/230 |
| 6,633,967 B1 * | 10/2003 | Duncan ................. 711/207 |
| 6,633,984 B2 | 10/2003 | Susser et al. ................. 713/201 |
| 6,671,707 B1 | 12/2003 | Hudson et al. ............. 707/206 |
| 6,675,191 B1 | 1/2004 | Ito ................. 709/102 |
| 6,691,118 B1 | 2/2004 | Gongwer et al. ............. 707/100 |
| 6,700,410 B2 | 3/2004 | Ebergen ................. 326/93 |
| 6,700,825 B1 | 3/2004 | Ebergen ................. 365/221 |
| 2001/0047468 A1 | 11/2001 | Parady ................. 712/228 |
| 2002/0052926 A1 | 5/2002 | Bush et al. ................. 709/217 |
| 2002/0062425 A1 | 5/2002 | Chauvel ................. 711/130 |
| 2002/0065993 A1 | 5/2002 | Chauvel ................. 711/144 |
| 2002/0069327 A1 | 6/2002 | Chauvel ................. 711/130 |
| 2002/0069328 A1 | 6/2002 | Chauvel ................. 711/130 |
| 2002/0069329 A1 | 6/2002 | James et al. ................. 711/135 |
| 2002/0129309 A1 | 9/2002 | Floyd et al. ................. 714/724 |
| 2002/0138717 A1 | 9/2002 | Joy et al. ................. 712/235 |
| 2002/0144081 A1 | 10/2002 | Willis et al. ................. 711/206 |
| 2003/0088610 A1 | 5/2003 | Kohn et al. ................. 709/107 |
| 2003/0097518 A1 | 5/2003 | Kohn et al. ................. 711/5 |
| 2003/0105756 A1 | 6/2003 | Daynes ................. 707/8 |
| 2003/0105907 A1 | 6/2003 | Kohn et al. ................. 710/305 |
| 2003/0120825 A1 | 6/2003 | Avvari et al. ................. 709/316 |
| 2003/0149861 A1 | 8/2003 | Becker ................. 712/214 |
| 2003/0163645 A1 | 8/2003 | Tremblay et al. ........... 711/137 |
| 2003/0191927 A1 | 10/2003 | Joy et al. ................. 712/228 |
| 2003/0212874 A1 | 11/2003 | Alderson ................. 711/170 |
| 2004/0002974 A1 | 1/2004 | Kravitz et al. ................. 707/8 |
| 2004/0003208 A1 | 1/2004 | Damron ................. 712/225 |
| 2004/0003211 A1 | 1/2004 | Damron ................. 712/228 |
| 2004/0006633 A1 | 1/2004 | Chandra et al. ............. 709/231 |
| 2004/0034853 A1 | 2/2004 | Gibbons et al. ............. 717/174 |
| 2004/0064654 A1 | 4/2004 | Willis et al. ................. 711/150 |
| 2004/0073906 A1 | 4/2004 | Chamdani et al. ........... 718/102 |
| 2004/0221131 A1 | 11/2004 | Brewer ................. 711/207 |

OTHER PUBLICATIONS

G. Dimitriou et al., "Loop Scheduling for Multithreaded Processors," Int. Conf. on Parallel Computing in Electrical Engineering, Dresden, Germany, Sep. 7-10, 2004, IEEE.

J. Redstone et al., "Mini-threads: Increasing TLP on Small-Scale SMT Processors," Proc. 9th International Symposium on High-Performance Computer Architecture, Feb. 8-12, 2003, IEEE.

R. Heald et al., "A Third-Generation SPARC V9 64-b Microprocessor," IEEE JSSC, Nov. 2000, pp. 1526-1538.

"Igniting a Computing Revolution! Throughput Computing," Sun Microsystems Brochure.

"Introduction to Throughput Computing," Sun Microsystems whitepaper, Feb. 2003.

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the 27th ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

* cited by examiner

MULTIPLE CONTEXTS FOR EFFICIENT USE OF TRANSLATION LOOKASIDE BUFFER

BACKGROUND OF THE INVENTION

1. Field of the Invention

The present invention relates generally to the field of processor or computer design and operation. In one aspect, the present invention relates to memory operations in a multi-threaded processor and, in particular, to an improved method and apparatus for efficient use of translation lookaside buffers.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years—one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount of inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading complicates any ordering and coherency requirements for memory operations when multiple threads and/or multiple processors are vying for access to any shared memory resources.

Most software uses an abstracted view of memory. Rather than using the actual physical address of instructions and data, software typically uses virtual addresses which must be translated by hardware into physical addresses. The virtual address to physical address translation provides both protection and relocation. Protection prevents a program from accessing regions of physical memory not allocated to that program, and it prevents the program from accessing the regions allocated to it in ways that have been disallowed. Relocation permits arbitrary mappings between regions (pages) of virtual addresses and physical addresses. These mappings are maintained in translation table entries (TTEs) and are cached in hardware structures called translation lookaside buffers (TLBs).

Many modern processors prevent one process from accessing another process's TTEs through a context field in the TTE. This context field must match the context of the request for the hardware to translate the virtual address (provided by the operating system for each process) into a physical address. The context field prevents one process from accessing another process's TTEs and consequently another process's physical memory.

However, certain applications and situations call for sharing of physical memory. If the applications share all pages assigned to them, they may be assigned the same context, and thereby share the TTEs in the TLBs. However, in the case of two processes that cannot share all physical pages, then the processes must have different context values. If the processes have different context values, then they cannot share TTEs at all, even for physical pages that are shared.

Accordingly, improved memory operations for multi-threading and/or multi-core processors and operating methods are needed that are economical in resources and avoid costly overhead which reduces processor performance. In particular, there is a need for an improved method and apparatus for improving translation lookaside buffer performance in multithreading and/or multi-core processors. Further limitations and disadvantages of conventional systems will become apparent to one of skill in the art after reviewing the remainder of the present application with reference to the drawings and detailed description which follow.

SUMMARY OF THE INVENTION

The method and apparatus of the present invention provides increased efficiency for translation lookaside buffers by collapsing redundant translation table entries into a single translation table entry (TTE). In the present invention, each thread of a multithreaded processor is provided with multiple context registers. Each of these context registers is compared independently to the context of the TTE. If any of the contexts match (and the other match conditions are satisfied), then the translation is allowed to proceed. Two applications attempting to share one page but that still keep separate pages can then employ three total contexts. One context is for one application's private use; one of the contexts is for the other application's private use; and a third context is for the shared page.

In one embodiment of the invention, two contexts are implemented per thread (hereinafter sometimes referred to as "context_0" and "context_1"). However, the teachings of the present invention can be extended to a higher number of contexts per thread. In one embodiment of the invention, one of the contexts, e.g., context_0, is used to maintain backward compatibility for older operating systems and programs operating in conjunction with newer software. In this embodiment of the invention, the context_0 register is located in the address space at the same location that the previous (single) context register occupied in prior software systems. In prior implementations, a tag-access register was updated with both the virtual address and the context of a translation request that misses in the TLB. In the present invention, the virtual address and context_0 of translations that miss are stored. The invention treats writes to the context_0 register as writes to both the context_0 and context_1 registers. Therefore, software that is unaware of the context_1 register will still only be using a single context value. Thus, the present invention maintains backward compatibility for software that is unaware of the multiple contexts.

DETAILED DESCRIPTION

Figure 1:
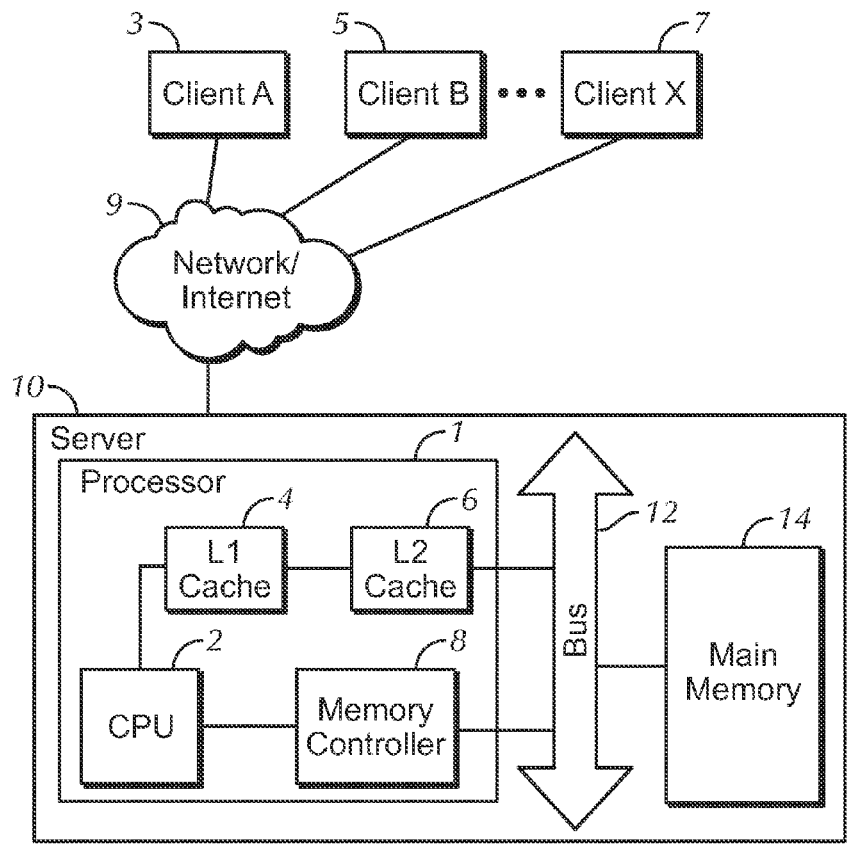
FIG. 1 illustrates a computer system in a communication network.
Figure 2A:
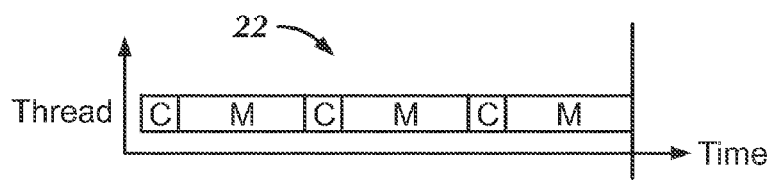
FIGS. 2a and 2b are timing diagrams respectively illustrating execution flows of a single-thread processor and a vertical multithread processor.
Figure 2B:
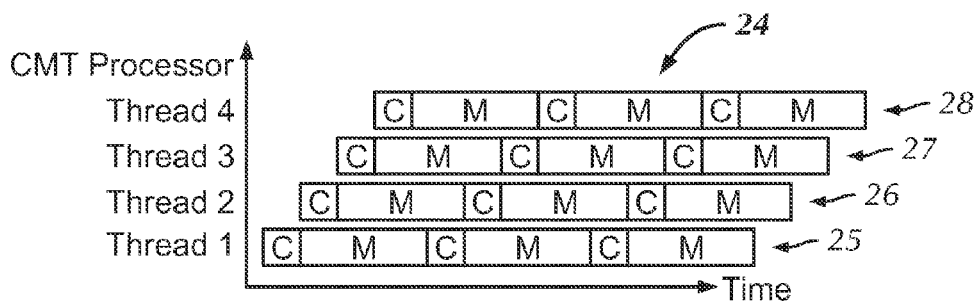
Figure 3:
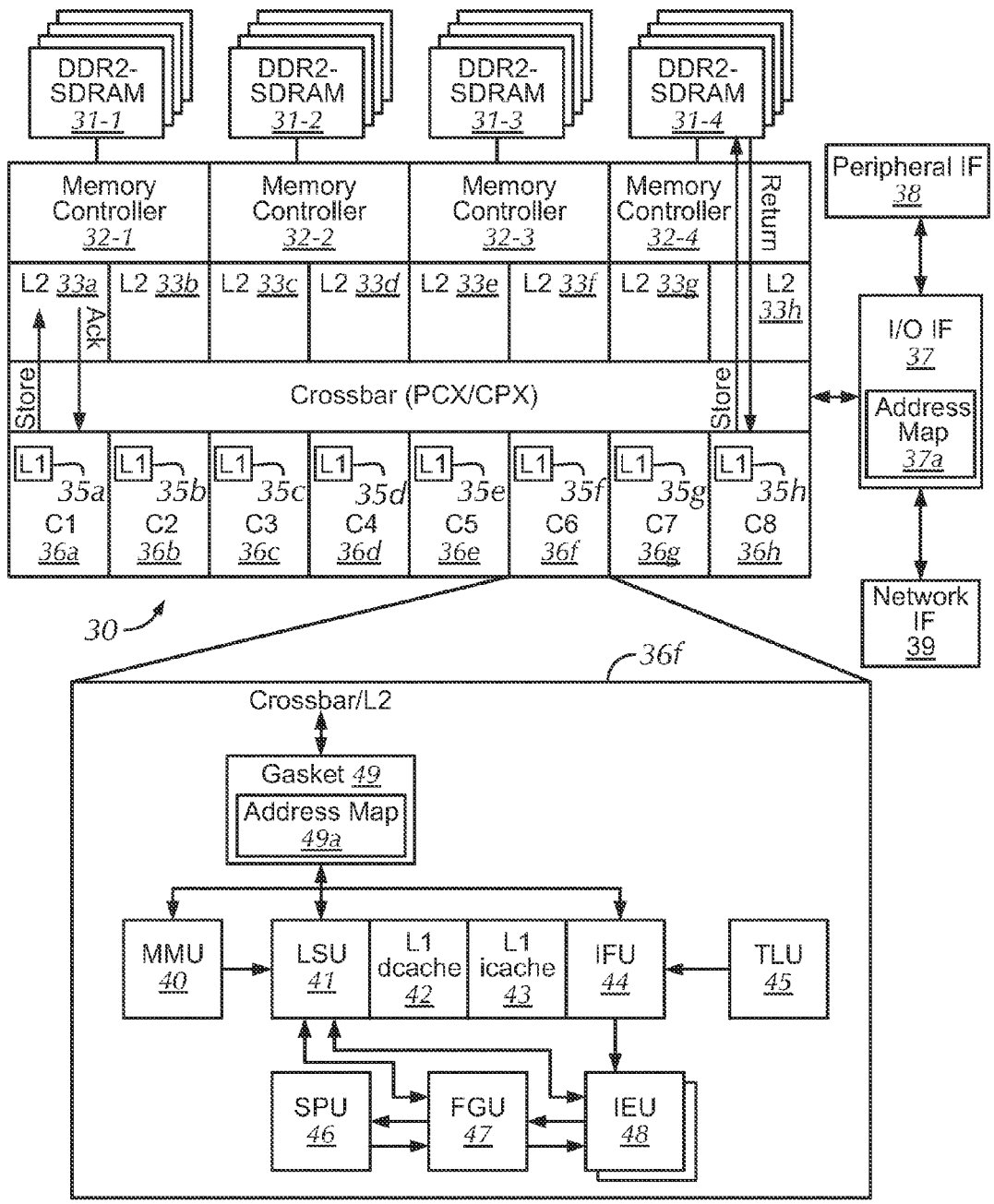
FIG. 3 illustrates a simplified schematic diagram of a processor having multiple processor cores for executing multiple threads, wherein each core contains a first level cache and the multiple cores share a second level cache in accordance with an exemplary embodiment of the invention.

The present invention provides a method and apparatus to improve the efficiency of translation lookaside buffers, especially in data processing systems having multiple processor cores for processing multiple threads. As explained herein, when multiple thread and/or processor operations are using a shared memory system, the memory operations must be coordinated so that each thread can access the memory in an ordered and coherent way with minimal delay or latency. A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC, or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD, or IBM. However, any other suitable single or multiple microprocessors, microcontrollers, or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that cores may process different numbers of threads.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment, crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34 (processor to cache and cache to processor, a.k.a. PCX and CPX).

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in the L2 cache (i.e., a "miss"), the data is fetched from main memory 31 and a copy of the data and its address is stored in the L2 cache 33 for future access.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure.

Figure 4:
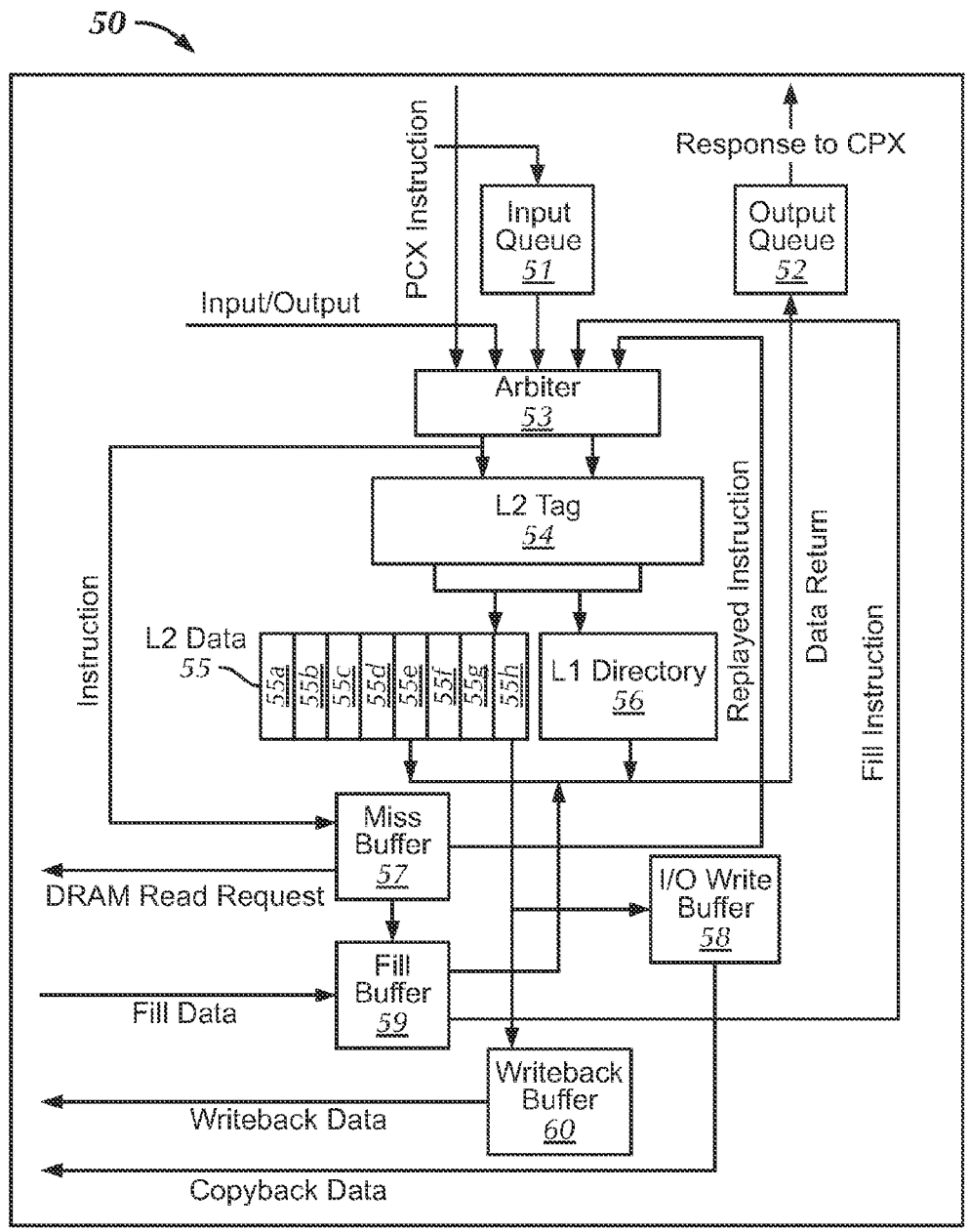
FIG. 4 depicts the organization of a second level cache memory in accordance with an illustrative embodiment of the invention.

FIG. 4 depicts the organization of an L2 cache memory 50 in accordance with an illustrative embodiment of the invention. The L2 cache 50 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 50 includes an L2 data array 55 and tag array 54 configured to cache instructions and data for use by cores. In the illustrated embodiment, L2 cache 50 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 50 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 50 may be implemented in some embodiments as a writeback cache in which written (dirty) data may not be written to system memory until a corresponding cache line is evicted.

In some embodiments, L2 cache 50 may implement an input queue 51 for holding requests arriving from the crossbar, and an output queue 52 for buffering results to be sent to the crossbar. Additionally, in some embodiments, L2 cache 50 may implement a fill buffer 59 configured to store fill data arriving from memory controller 32, a writeback buffer 60 configured to store dirty evicted data to be written to memory, an I/O write buffer 58 configured to store incoming data from the crossbar in the event of multi-cycle memory write operations and/or a miss buffer 57 configured to store L2 cache accesses that cannot be processed as simple cache hits (e.g., L2 cache misses, cache accesses matching older misses, accesses such as atomic operations that may require multiple cache accesses, etc.). L2 cache 50 may variously be implemented as single-ported or multi-ported (i.e., capable of processing multiple concurrent read and/or write accesses). In either case, L2 cache 50 may implement arbitration logic 53 to prioritize cache access among various cache read and write requesters. While the L2 cache 50 may include a tag array 54 for holding the memory addresses of the L2 cache data array 55, the L2 cache 50 may also advantageously include an additional tag array 54 for holding the memory addresses of each L1 cache data array in each processor core. The additional tag array 54 is referred to as the L1 directory because it maintains a copy of the L1 tags for coherency management and also ensures that the same line is not resident in both the instruction cache and data cache (across all cores). Thus, the L1 directory 56 is split into an instruction cache directory and a data cache directory. On certain data accesses, the L1 directory 56 is CAMed to determine whether the data is resident in L1 caches. The result of this CAM operation is a set of match bits which is used to create an invalidation vector to be sent back to the processor cores.

Referring again to FIG. 3, the L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36f employing fine-grained multithreading, instructions from different threads may occupy adjacent pipeline stages, such that instructions from several threads may be in various stages of execution during a given core processing cycle.

Figure 5:
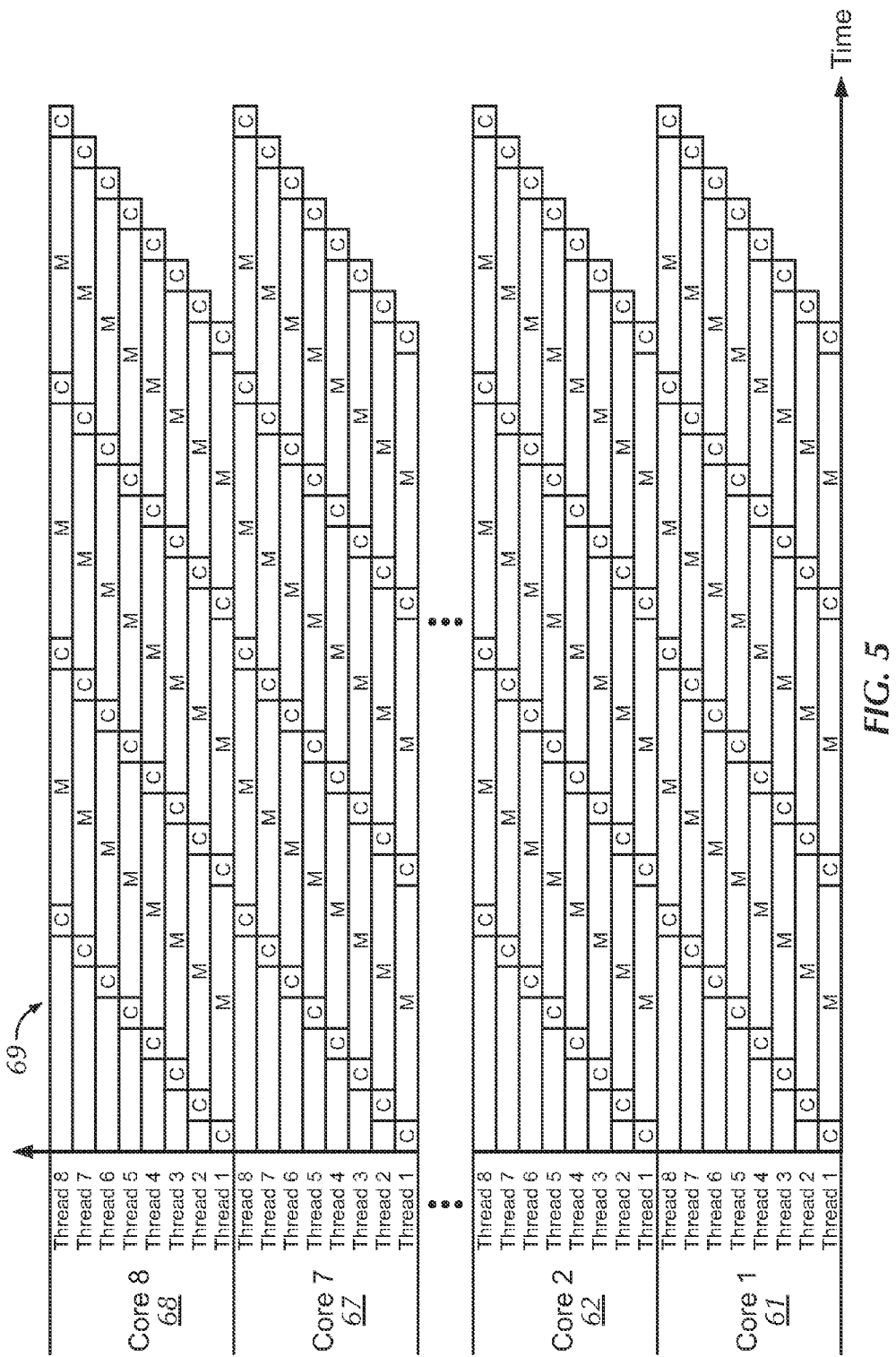
FIG. 5 is a timing diagram illustrating an execution flow of a vertical and horizontal multithread processor in accordance with an illustrative embodiment of the invention.

FIG. 5 is a timing diagram illustrating execution flow of a vertical and horizontal multithread multiprocessor embodiment of the invention using a high throughput architecture with eight processor cores 61-68, each having eight threads. In FIG. 5, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., Core 1) will require a memory system that can process multiple references or threads simultaneously. For example, multiple memory operations must be coordinated so that each thread can access the L2 cache 33 or system memory in an ordered and coherent way with minimal contention, delay or latency.

In accordance with a selected embodiment of the present invention, the processor cores can be replicated a number of times in the same area. This is also illustrated in FIG. 3, which illustrates a collection of eight processor cores on a single integrated circuit die. Likewise, FIG. 5 illustrates the timing diagram for an execution flow of a horizontal threaded processor with multiple, vertical threaded processor cores, using a technique called chip multiprocessing. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 5 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multi-threading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can coordinate multiple memory operations where, for example, each thread must access the L2 cache 33 or system memory in an ordered and coherent way with minimal contention, delay or latency.

In the illustrative embodiment depicted in FIG. 3, each core (e.g., 36f) may be configured to perform fine-grained horizontal multithreading operations. The depicted core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. The FGU 47 is coupled to a stream processing unit (SPU) 46. Additionally, LSU 41, IFU 51 and MMU 40 are coupled to a gasket or interface unit 49 for interface to the crossbar 34.

As illustrated, each threaded core (e.g., C6 36f) includes a first level (L1) cache (e.g., 35f) which includes a data cache (dcache) segment 42 and an instruction cache (icache) segment 43. In operation, the instruction fetch unit (IFU) 44 retrieves instructions for each thread and stores them in an instruction cache 43 and instruction buffers (not shown). IFU 44 then selects two instructions to execute among eight different threads, and provides the instructions to the decode unit which decodes one instruction each from two thread groups per cycle and supplies the pre-decoded instruction to the execution units 48. Each integer execution unit includes an arithmetic logic unit (ALU), shifter, and integer register files for processing and storing thread status information. Execution unit results are supplied via selection circuits to the shared FGU 47 and LSU 41. A single data cache 42 may also be provided in the LSU 41.

The system of the present invention comprises a "hypervisor" function that is operable to aggregate processing resources and memory resources into a plurality of partitions. As will be understood by those of skill in the art, the hypervisor is responsible for managing the partitioning and association of the processing entities and the memory resources. Each processor thread is assigned a partition ID (PID) register. The PID is used by the hypervisor to aggregate and separate processing and memory resources in accordance with a specific process. For additional details concerning the design and operation of the processor core and its constituent resources, see co-pending U.S. patent application Ser. No. 10/880,488, entitled "Apparatus And Method For Fine-Grained Multithreading In A Multi-Pipelined Processor Core," filed Jun. 30, 2004, and assigned to Sun Microsystems, which is hereby incorporated by reference in its entirety.

As was discussed hereinabove, modern processor architectures commonly support multiple virtual memory page sizes in order to efficiently map both large and small memory regions into processes' address spaces. The mapping of virtual to physical memory is accomplished via software-programmed tables in physical memory referred to as translation storage buffers (TSBs). These tables are cached in hardware structures referred to as translation lookaside buffers (TLBs). For each processor access that requires an address translation, it is necessary to look up the virtual address of the access in the TLB. The translation request includes the virtual address, the context and the partition ID. If the translation request hits in the TLB, the TLB returns the physical address where the item resides. If the translation request misses in the TLB, the TLB contents need to be updated.

Figure 6:
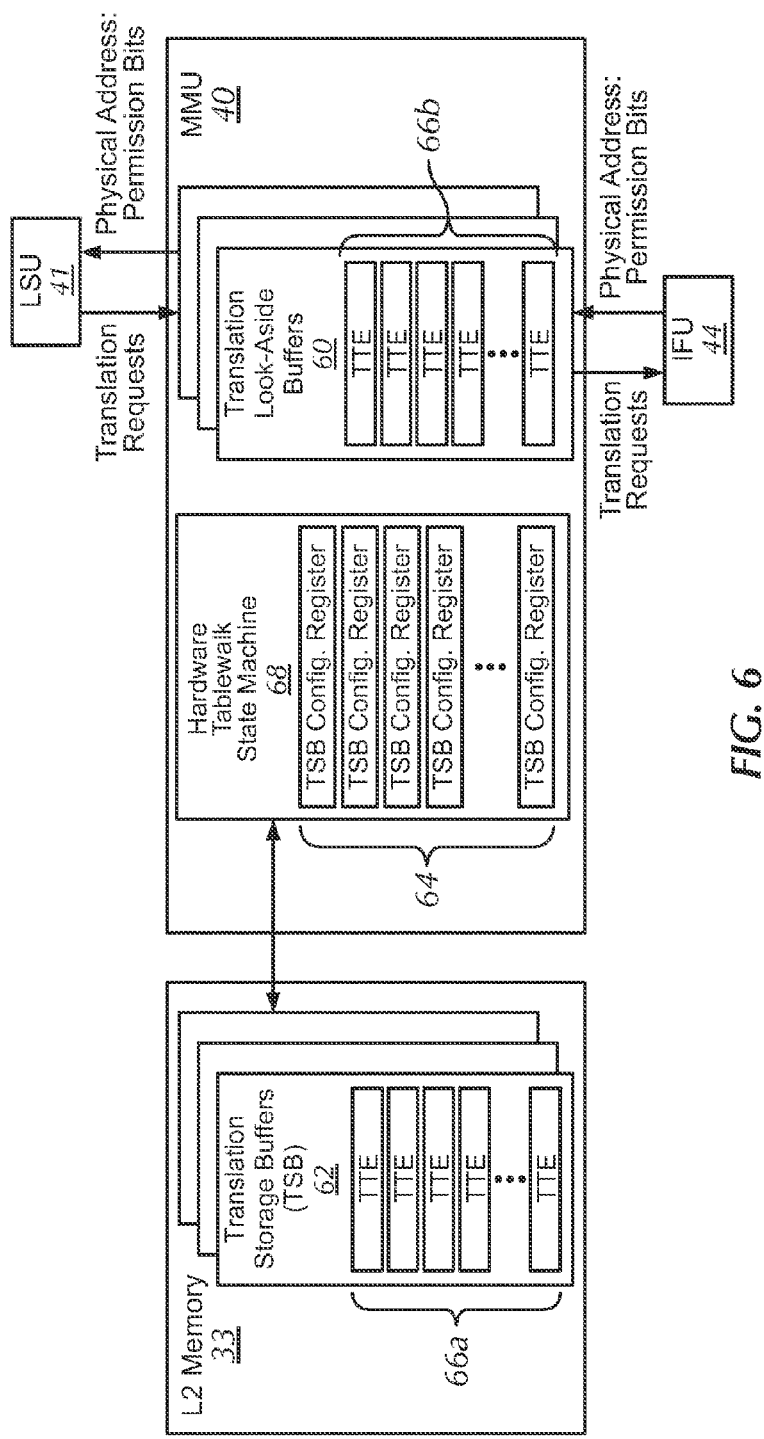
FIG. 6 is a generalized block diagram illustration of the main functional components of a memory management unit used in the multiprocessor-multithread integrated circuit of the present invention.

FIG. 6 is a generalized block diagram illustration of the main functional components of a MMU 40 used in the multiprocessor-multithread integrated circuit of the present invention. The TLBs 60 accept translation requests from the LSU 41 and the IFU 44 and provide physical addresses and permission bits in response to the translation requests. The MMU 40 reads the TSBs 62 to reload the TLBs 60 for the instruction and data caches. The MMU 40 receives reload requests for the TLBs 60 and uses a hardware tablewalk state machine 68, described in greater detail below to find valid TTEs 66a in the TSBs 62 for the requested access. The TLBs 60 use the TTEs 66b to translate virtual addresses (VAs) into physical addresses (PAs). The TLBs 60 also use the TTEs 66b to validate that a request has the permission to access the requested address.

The hardware tablewalk state machine 68 services reload requests from the TLBs 60. It accesses the TSBs 62 to locate TTEs 64 that match the VA and one of the contexts of the request. The hypervisor is operable to provide appropriate configuration to permit the hardware tablewalk state machine 68 to load supervisor-controlled TTEs into the TLBs that are used to translate VAs into PAs. In an embodiment of the invention, the hardware tablewalk state machine 68 is threaded and supports multiple TSBs per thread, thereby allowing up to four TSB accesses for each of the eight threads.

Hardware tablewalk state machine 68 uses the TSB configuration registers 64, the context of the translation request and the VA of the access to calculate the address of the TTE to examine. The TSB configuration register provides the base address of the TSB as well as the number of TTEs in the TSB and the size of the pages translated by the TTEs. The hardware tablewalk state machine 68 uses a "nonzero context" TSB configuration register if the context of the request is nonzero; otherwise it uses a "zero context" TSB configuration register. The context of the request is assumed to be the content of context register 0 (in the event on a TLB miss on a primary or secondary context access). The hardware tablewalk state machine uses the page size from the TSB configuration register to calculate the presumed VPN for the given VA. The hardware tablewalk state machine 68 then uses the number of TTE entries and the presumed VPN to generate an index into the TSB. This index is concatenated with the upper bits of the base address to generate the TTE address.

The hardware tablewalk state machine 68 forwards the TTE address to the gasket 49, which forwards the load request to the L2. Subsequently, the L2 returns the TTE to the gasket 49. The gasket 49 then forwards the TTE to the hardware tablewalk state machine 68. The hardware tablewalk state machine compares the VPN and context of the request to that from the TTE.

Figure 7B:
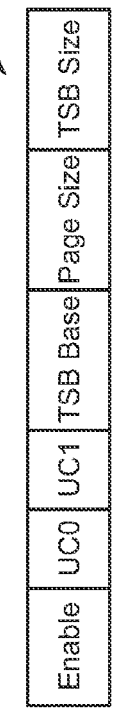
FIG. 7b is an illustration of a translation storage buffer configuration register used in one embodiment of the present invention.
Figure 7A:
FIG. 7a is an illustration of a translation table entry used in one embodiment of the present invention.

FIG. 7a is an illustration of a TTE 66 used in one embodiment of the present invention. The TTEs comprises a tag section and a data section. The tag holds the context and the virtual page number, which the hardware tablewalk state machine 68 compares to the accesses as discussed in greater detail hereinbelow. If the context and page number match, the hardware tablewalk provides the physical page number. FIG. 7b is an illustration of a configuration status register 64 which comprises an enable bit, user contexts 0 and 1, a TSB base address, and data fields for the page size and the TSB size.

The method and apparatus of the present invention provides increased efficiency for translation lookaside buffers by collapsing redundant translation table entries into a single translation table entry. In present invention, each thread of a multithreaded processor is provided with multiple context registers. Each of these context registers is compared independently to the context of the TTE. If any of the contexts match (and the other match conditions are satisfied), then the TLB hits and it provides the PA and permission bits. Two applications attempting to share one page but that still keep separate other pages can then employ three total contexts.

One context is for one application's private use; one of the contexts is for the other application's private use; and a third context is for the shared page.

In one embodiment of the invention, two contexts are implemented per thread (context_0 and context_1). However, the teachings of the present invention can be extended to a higher number of contexts per thread. In one embodiment of the invention context_0 is used to maintain backward compatibility for older operating systems and programs operating in conjunction with newer software. In this embodiment of the invention, the context_0 register is located in the address space at the same place that the previous (single) context register held in prior software systems. In prior implementations, a tag access register is updated with both the virtual address and the context of a translation request that misses in the TLB. In the present invention, the virtual address and context_0 of translations that miss are stored. The invention treats writes to the context_0 register as writes to both the context_0 and context_1 registers. In this way, software that is unaware of the context_1 register will still only be using a single context value. Thus, the present invention maintains backward compatibility for software that is unaware of the multiple contexts.

The Use_Context_O (UC_0) and Use_Context_1 (UC_1) bits in the TSB configuration register 64 disable the context match for the hardware tablewalk state machine 68. The hardware tablewalk state machine 68 ignores the contexts in the TTEs 66a if either of these bits is active for requests with nonzero contexts. If either bit is one and the VPN matches, the hardware tablewalk state machine 68 signals the TLB to write either context 0 or context 1 (depending on which bit is set) as the context of the TTE when it is loaded (instead of the context in the TTE itself). Hardware tablewalk ignores these bits for requests with zero contexts.

As set forth above, a method and apparatus for improving translation lookaside buffer reload performance is described. For clarity, only those aspects of the chip multithreading (CMT) processor system germane to the invention are described, and product details well known in the art are omitted. For the same reason, the computer hardware is not described in further detail. It should thus be understood that the invention is not limited to any specific logic implementation, computer language, program, or computer. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The method and apparatus of the present invention provides increased efficiency for translation lookaside buffers. As will be understood by those of skill in the art, TLB capacity is important to the overall performance of the processing system. Each time a request misses the TLB, the application must stop processing and the TLB must be reloaded (either by the software explicitly updating the TLB or through hardware tablewalk servicing the request). By enabling sharing between contexts between processes as described hereinabove, the number of TLB entries required to support a given performance level may be reduced or, alternatively, performance is higher with a constant number of TLB entries.

While the present invention has been particularly described with reference to FIGS. 1-7 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor comprising:
a plurality of processor cores, wherein each core supports processing of a plurality of threads by generating address translation requests for data and instructions related to processing of said plurality of threads and wherein each of the threads is associated with at least one of a plurality of contexts; and
a memory management unit operable to control access to data and instructions for said plurality of threads based on at least one of the contexts associated with at least one of the plurality of threads, said memory management unit being operable to compare, for each thread seeking to access a translation table entry, a) each context associated with the thread with b) a context associated with the translation table entry and in the event of a match allow access to the translation table entry to complete an address translation request on behalf of the thread;
wherein the processor is operable to perform writes and wherein a write associated with a first one of the plurality of contexts that is associated with a first one of the plurality of threads updates both the first context and a second one of the plurality of contexts that is associated with the first thread, and a write associated with the second context updates only the second context.

2. The single chip multithreaded processor of claim 1, wherein the plurality of processor cores comprises at least eight processor cores, where each core supports at least eight threads.

3. The single chip multithreaded processor of claim 1, wherein said memory management unit is operable to selectively disable all but one of said contexts.

4. The single chip multithreaded processor of claim 1, wherein selected sets of said plurality of threads are associated in a plurality of partitions.

5. The single chip multithreaded processor of claim 4, wherein operation of said selected sets of threads within said plurality of partitions is managed by a hypervisor.

6. The single chip multithreaded processor of claim 1, wherein said memory management unit uses translation table entries to translate virtual addresses into physical addresses to implement memory transfers.

7. The processor of claim 1, wherein the write associated with the first context writes a value into both the first context and the second context and the write associated with the second context writes a value into only the second context.

8. A method for managing the transfer of data between processing resources and memory resources in a single chip multithreaded processor comprising:

processing multiple threads in a plurality of processor cores by generating address translation requests for instructions and data related to processing of said multiple threads;

associating each of the plurality of threads with at least one of a plurality of contexts;

controlling access to the data and instructions based on at least one of the contexts associated with at least one of the plurality of threads, wherein the controlling comprises comparing, for each thread seeking to access a translation table entry, a) each context associated with the thread with b) a context associated with the translation table entry, and in the event of a match, allowing access to the translation table entry to complete an address translation request on behalf of the thread;

updating a first one of the plurality of contexts that is associated with a first one of the plurality of threads and a second one of the plurality of contexts that is associated with the first thread, via a write associated with the first context; and updating only the second context via a write associated with the second context.

9. The method of claim 8, wherein the plurality of processor cores comprises at least eight processor cores, where each core supports at least eight threads.

10. The method of claim 8, wherein said memory management unit is operable to selectively disable all but one of said contexts.

11. The method of claim 8, wherein selected sets of said plurality of threads are associated in a plurality of partitions.

12. The method of claim 11, wherein operation of said selected sets of threads within said plurality of partitions is managed by a hypervisor.

13. The method of claim 8, wherein said memory management unit uses translation table entries to translate virtual addresses into physical addresses to implement memory transfers.

14. The method of claim 8, wherein the write associated with the first context writes a value into both the first context and the second context and the write associated with the second context writes a value into only the second context.

15. A single chip multithreaded processor comprising:

a plurality of means for processing data, wherein each of said means for processing data supports processing of a plurality of threads by generating address translation requests for data and instructions related to processing of said plurality of threads;

means for managing access to data and instructions for said plurality of threads; said means for managing the access being operable to:

selectively associate each of said plurality of threads with at least one of a plurality of contexts;

control access to the data and instructions based on at least one of the contexts associated with at least one of the plurality of threads, by comparing, for each thread seeking to access a translation table entry, a) each context associated with the thread with b) a context associated with the translation table entry, and in the event of a match, allow access to the translation table entry to complete an address translation request on behalf of the thread;

update both a first one of the plurality of contexts that is associated with a first one of the plurality of threads and a second one of the plurality of contexts that is associated with the first thread, via a write associated with the first context; and update only the second context via a write associated with the second context.

16. The single chip multithreaded processor of claim 15, wherein the means for processing data comprises at least eight processor cores, where each core supports at least eight threads.

17. The single chip multithreaded processor of claim 15, wherein said means for managing the transfer of data is operable to selectively disable all but one of said contexts.

18. The single chip multithreaded processor of claim 15, wherein selected sets of said plurality of threads are associated in a plurality of partitions.

19. The single chip multithreaded processor of claim 18, wherein operation of said selected sets of threads within said plurality of partitions is managed by a hypervisor.

20. The single chip multithreaded processor of claim 15, wherein said memory management unit uses translation table entries to translate virtual addresses into physical addresses to implement memory transfers.

21. The processor of claim 15, wherein the write associated with the first context writes a value into both the first context and the second context and the write associated with the second context writes a value into only the second context.

* * * * *